3,123,605
BASIC ANTHRAQUINONE DYESTUFFS

Melvin N. Turetzky, East Brunswick, and Leon Katz, Springfield, N.J., assignors to General Aniline & Film Corporation, New York, N.Y., a corporation of Delaware
No Drawing. Filed Jan. 8, 1960, Ser. No. 1,181
6 Claims. (Cl. 260—247.5)

The present invention relates to certain basic anthraquinone dyestuffs and to a method for producing the same. More particularly, the present invention relates to the preparation of novel anthraquinone-substituted quaternary amines.

An important object of this invention is the provision of novel anthraquinone dyestuffs which are particularly suitable for dyeing synthetic fibers having a basis of polyacrylonitrile in bright, full shades of excellent light fastness.

A further object of this invention is to provide water-soluble anthraquinone dyestuffs which dye synthetic fibers, particularly those having a basis of polyacrylonitrile, directly from an aqueous bath without the aid of conventional dispersing agents.

Another object of this invention is to provide a novel method for the preparation of anthraquinone-substituted quaternary amines.

Other objects and advantages of this invention will appear from the following detailed description.

The dyestuffs of this invention correspond to the general formula

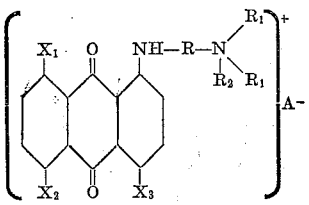

wherein $X_1$ is selected from the group consisting of hydrogen, hydroxyl, chloro, and nitro; $X_2$ is selected from the group consisting of hydrogen, hydroxyl, chloro, nitro, amino, and benzamido; $X_3$ is selected from the group consisting of hydrogen, hydroxyl, chloro, amino, and methylamino; R is an alkylene group having from 2 to 6 carbon atoms; each $R_1$ is alkyl having from 1 to 2 carbon atoms, and wherein both $R_1$ substituents, when taken together with the nitrogen atom to which they are attached, form the morpholinyl radical; and $R_2$ stands for a lower alkyl group (e.g. methyl or ethyl) introduced during quaternization. $A^-$ is an anion, introduced during quaternization, necessary to balance the positive charge on the nitrogen atom of the quaternary amino group.

New dyestuffs are obtained by carrying out reactions in two stages, starting with a corresponding anthraquinone base. Examples of suitable anthraquinone bases are Quinizarin
Leucoquinizarin
Leucotetra (1,4,5,8-tetrahydroxy anthraquinone, leuco form)
1-amino-4-hydroxy anthraquinone
Purpurin (1,2,4-tri-hydroxyanthraquinone)
Krisolamine (1,4-diaminoanthraquinone)
1-hydroxy-4-chloroanthraquinone
1-amino-4-hydroxy-5-chloroanthraquinone
4,5-dinitrochrysazine
4,8-dinitroanthrarufin
1-amino-2,4-dibromoanthraquinone
1-methylamino-4-bromoanthraquinone
1-amino-2-methyl-4-chloroanthraquinone
1-benzamido-5-chloroanthraquinone
1,4,5,8-tetrachloroanthraquinone The anthraquinone is reacted with an amine corresponding to the formula

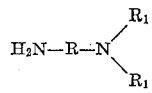

wherein R and $R_1$ have the significances hereinbefore set forth. Examples of suitable amines are N,N-diethylethylene diamine
N,N-dimethylethylene diamine
3-dimethylamino propylamine
3-diethylaminopropylamine
N-(3-amino propyl) morpholine
3-N,N-dibutylamino propylamine The reaction is carried out in virtually any organic solvent, e.g. hydrocarbons, alcohols, ethers, ketones, esters, etc., specific examples of which are

| | |
|---|---|
| Benzene | Xylene |
| Toluene | Trichlorobenzene |
| o- or m-Dichlorobenzene | Monochlorobenzene |
| Methanol | Ethanol |
| n-Butanol | 2-ethylhexanol |
| Dioxane | Diacetone alcohol |
| Amyl acetate | Ethyl acetate |
| Methyl isobutyl ketone | Methyl ethyl ketone |
| Ethylene glycol | Methyl Cellosolve |
| Ethylene glycol dimethyl ether | Diethylene glycol |

Preferably chlorohydrocarbon solvents are employed for the reaction for the reason which is set forth below.

In the second stage of the process the amine product is treated with a quaternizing agent. Advantageously, use of a hydrocarbon solvent for the first stage permits the entire reaction mixture to be treated directly with the quaternizing agent, and the anthraquinone-substituted quaternary amine precipitates directly from this reaction mixture in relatively pure form.

Suitable quaternizing agents for the preparation of the instant dyestuffs comprise lower alkyl halides such as methyl, ethyl and propyl chlorides, bromides and iodides, and alkyl esters of strong acids such as dimethyl sulfate, ethyl-p-toluenesulfonate and the like.

The dyestuffs of the present invention are water-soluble and dye synthetic fibers directly from an aqueous bath even without the aid of conventional dispersing agents. While the dyestuffs of the invention build up to bright full shades of excellent light fastness on polyacrylonitrile fibers, they also yield good tinctorial results on other synthetic fibers such as polyester and polyamide fibers.

More specifically the reaction between the anthraquinone base and the amine is effected at reflux temperature for from 2 to 14 hours, after which the quaternizing agent is passed into the reaction mixture until quaternization is complete. The reaction mixture may again be subjected to reflux temperature, if necessary.

The invention is illustrated but not limited by the following examples in which the parts are by weight.

Example 1

500 parts of benzene, 54 parts of leuco-1,4,5,8-tetrahydroxy anthraquinone and 81 parts of dimethylaminopropylamine are heated at reflux for eight hours. Then 55 parts of sodium metanitrobenzene sulfonate are added and the reaction maintained 2–3 hours longer. Finally methyl bromide gas is passed in until quaternization is complete. The dyestuff is filtered off, washed with hot benzene until the washings are virtually colorless and the product on the funnel dried in a vacuum oven.

The dyestuff, thus obtained, is a solid that dissolves completely in water yielding a bright green blue solution.

The solution dyes polyacrylonitrile fibers to give greenish blue shades of excellent build-up and fastness to light.

Example 2

291 parts of methyl Cellosolve (monomethyl ether of ethylene glycol), 30 parts of 1-methylamino-4-bromo-anthraquinone, 32 parts of N-(3-aminopropyl) morpholine and 3.2 parts of cupric acetate are heated at reflux for 9 hours. Ethyl chloride gas is then passed in until quaternization is complete. The methyl Cellosolve is evaporated and the product purified by dissolving it in water and precipitating it out with 25% potassium carbonate solution.

The resulting dyestuff is completely water-soluble and dyes synthetic fibers a brilliant blue, directly from its aqueous bath.

Example 3

50 parts of trichlorobenzene, 4.0 parts of 1-benzamido-5-chloroanthraquinone, 1.4 parts of diethylaminopropylamine, 1.4 parts of sodium carbonate and 0.06 part of copper powder are charged into a 100 cc. flask and heated at reflux for 6 hours. Methyl bromide gas is then passed in at 80–90° C. until quaternization is complete. The dyestuff is filtered off, washed with benzene until the washings are colorless and the product dried in the vacuum oven.

The resulting dyestuff is water-soluble and dyes synthetic fibers violet directly from its aqueous bath.

Example 4

40 parts of trichlorobenzene, 4.0 parts of 1-amino-4-hydroxy-5-chloroanthraquinone, 1.5 parts of dimethylaminopropylamine, and 0.2 part of copper powder are charged into a 100 cc. flask, heated at 125–130° C. for 3 hours and then at reflux for 14 hours. Methyl bromide gas is then passed in for one hour, after which the dyestuff is filtered off and washed with benzene and then dried.

The resulting dyestuff, 1-amino-4-hydroxy-5-(γ-trimethylammonium) propylamino anthraquinone bromide, dyes synthetic fibers violet.

Example 5

40 parts of ethylene glycol dimethyl ether, 4.0 parts of purpurin (1,2,4-trihydroxy anthraquinone), 1.7 parts of dimethylaminopropylamine, 1.0 part of boric acid, 0.5 part of zinc dust, and 1.5 parts of hydrochloric acid are heated at reflux for 2 hours. Methyl bromide gas is then passed in for 1 hour, after which the dyestuff is filtered off, washed with benzene and dried.

The resulting dyestuff dyes synthetic fibers in red shades directly from its aqueous bath.

Example 6

40 parts of ethylene glycol dimethyl ether, 4.0 parts of 1,5-dinitro-4,8-dihydroxyanthraquinone and 4.0 parts of dimethylaminopropylamine are heated at reflux for 5 hours. Methyl bromide is then passed in for 1 hour. The dyestuff is filtered off and washed with benzene, removing the by-products.

The resulting dyestuff is violet and completely soluble in water.

It will be understood from the formulas and description employed herein that, as employed herein in the specification and claims, the symbols

and

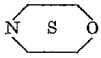

are intended to refer to benzene and morpholine nuclei, respectively.

Having thus disclosed the invention, what is claimed is:

1. Anthraquinone quaternary amines of the formula

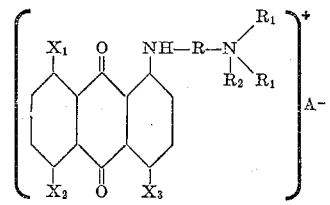

wherein $X_1$ is selected from the group consisting of hydrogen, hydroxyl, chloro, and nitro; $X_2$ is selected from the group consisting of hydrogen, hydroxyl, chloro, nitro, amino, and benzamido; $X_3$ is selected from the group consisting of hydrogen, hydroxyl, chloro, amino, and methylamino; R is alkylene having from 2 to 6 carbon atoms; each $R_1$ is alkyl having from 1 to 2 carbon atoms, and wherein both $R_1$ substituents, when taken together with the nitrogen atom to which they are attached, form the morpholinyl radical; $R_2$ is lower alkyl; and $A^-$ is an anion.

2. Anthraquinone quaternary amines of the formula

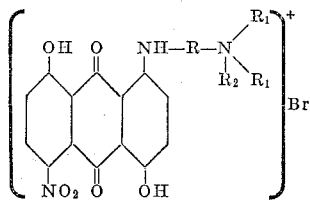

wherein R is alkylene having from 2 to 6 carbon atoms, $R_1$ is alkyl having from 1 to 2 carbon atoms, and $R_2$ is lower alkyl.

3. Anthraquinone quaternary amines of the formula

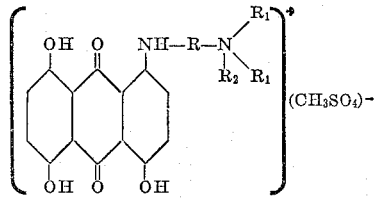

wherein R is alkylene having from 2 to 6 carbon atoms, $R_1$ is alkyl having from 1 to 2 carbon atoms, and $R_2$ is lower alkyl.

4. Anthraquinone quaternary amines of the formula

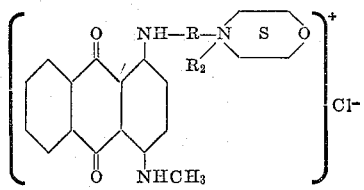

wherein R is alkylene having from 2 to 6 carbon atoms and $R_2$ is lower alkyl.

5. Anthraquinone quaternary amines of the formula

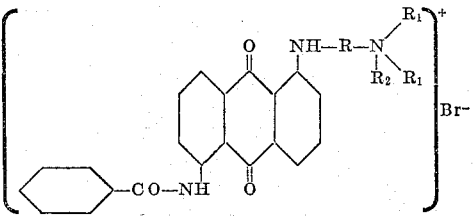

wherein R is alkylene having from 2 to 6 carbon atoms, $R_1$ is alkyl having from 1 to 2 carbon atoms, and $R_2$ is lower alkyl.

6. Anthraquinone quaternary amines of the formula
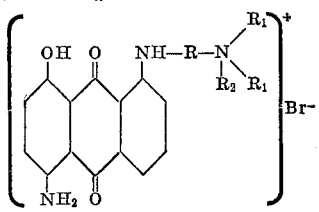
wherein R is alkylene having from 2 to 6 carbon atoms, $R_1$ is alkyl having from 1 to 2 carbon atoms, and $R_2$ is lower alkyl.
References Cited in the file of this patent
UNITED STATES PATENTS
2,716,655    Boyd ------------------ Aug. 30, 1955